July 19, 1966  G. D. DUMBAUGH ETAL  3,261,592
VIBRATORY HOPPER

Filed Nov. 4, 1963  2 Sheets-Sheet 1

INVENTORS.
GEORGE D. DUMBAUGH
ROBERT J. HESS
BY Marshall, Wilson & Yeasting
Attorneys

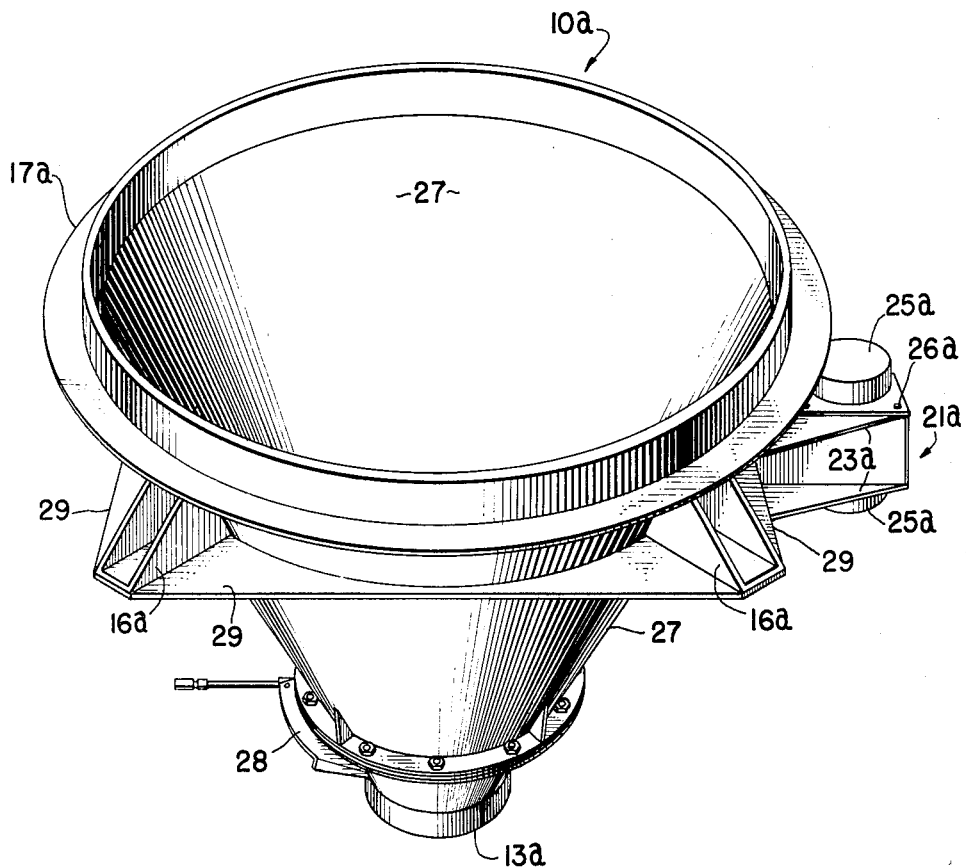

3,261,592
VIBRATORY HOPPER
George D. Dumbaugh and Robert J. Hess, Jeffersonville, Ind., assignors to Carrier Manufacturing Co., Jeffersonville, Ind., a corporation of Kentucky
Filed Nov. 4, 1963, Ser. No. 321,046
5 Claims. (Cl. 259—2)

This invention relates to gyratory or vibratory supply hoppers for discharging powdered, granular, pulverized, or the like material.

Heretofore, vibrated hoppers for difficult-to-handle materials have been restrained mechanically against movements other than substantially horizontal movements and have been vibrated by means producing forces having substantial vertical and horizontal components.

The production of the vertical force components, in the prior vibrated hoppers, which were not utilized to do work resulted in wasted power.

Also, the production of the vertical force components by the prior vibrating systems caused the hopper supports to vibrate. This is very unsatisfactory resulting, for example, in building vibration which deleteriously affects auxiliary equipment and processes, such as the accurate operation of weighing scales.

The prior hoppers, furthermore, were moved more at their lower ends than at their upper ends (tilt or wobble) resulting in a short amplitude packing action at such upper ends. This short amplitude, non-uniform agitation does not satisfactorily speed the flow of materials that tend to stick, bridge, etc.

Accordingly, the objects of this invention are to improve gyrated or vibrated hoppers, to improve the performance of such hoppers, to simplify the construction of such hoppers, to so arrange such hoppers that vertical force components transmitted to the hopper supports are negligible, to move such hoppers horizontally and equally from top to bottom to produce uniform agitation from top to bottom, and to produce in such hoppers high amplitude vibrations to move material without packing the material.

One embodiment of this invention enabling the realization of these objects is a hopper mounted to move in any direction which is vibrated by means of a rotating mass having a center of gravity in a horizontal plane passing through the center of gravity of the hopper. The center of gravity of the hopper is about the same whether it is full or empty. Any variance in the location of the center of gravity as the hopper goes from full to empty is immaterial in the practice of the invention because at worst such variance is small and in any event, in normal operation, the hopper always is full. The hopper is supported through isolation mounts and is hung from a larger stationary hopper or constitutes the entire hopper for relatively small volume storage.

This arrangement results in a combination movement for the hopper which rocks about its center of percussion and also slides in line with its center of percussion in a horizontal movement having negligible vertical components, i.e., the tilting or wobbling movements of the prior hoppers have been eliminated. The hopper is moved equally from top to bottom producing uniform agitation from top to bottom. The hopper tends to move horizontally only because the exciter is centered in the horizontal plane of the center of gravity of the hopper, there being no mechanical restrains against vertical hopper movements such as are found in the prior art.

One feature of this invention is to take advantage of the weakest characteristic of a material that tends to bridge, namely, its resistance to shear, which is generally much less than its resistance to impact. When the present hopper is used as an activated bottom of a large bin, the least amount of resistance is encountered, because the hopper tends to shear the material across its entire cross section. Also, the material that lies within the hopper itself, but below the "shearing line," is not caused to absorb high amounts of energy because of the elimination of the relative motion that would be obtained if the exciter were not centered in the horizontal plane containing the center of gravity of the hopper. Thus the present invention represents a "least energy consumed" approach and yet provides complete activation of the material, at the shear line and below.

Another feature of this invention resides in simplifying the construction of such a hopper system by eliminating the prior mechanical check means that functioned to hold the prior hoppers from moving vertically.

Another feature resides in the elimination of the vertical force components which in the prior hopper systems, were transmitted to the hopper supports. This, for example, eliminates building vibrations coming from this source.

Still another feature resides in increasing the efficiency of the vibratory system through the above arrangement. Vertical force components which do no work are not generated in the system of the invention.

A further feature resides in moving the hopper equally from top to bottom producing uniform agitation from top to bottom with high amplitude vibrations. This moves difficult-to-handle materials without packing them (powdered, granular, pulverized, or the like materials) and prevents or breaks bridging at all levels in the hopper.

The above and other objects and features of this invention will be appreciated more fully from the following detailed description when read with reference to the accompanying drawings wherein:

FIG. 3 is a perspective view of a modification of the hopper shown in FIGS. 1 and 2.

Figure 1:
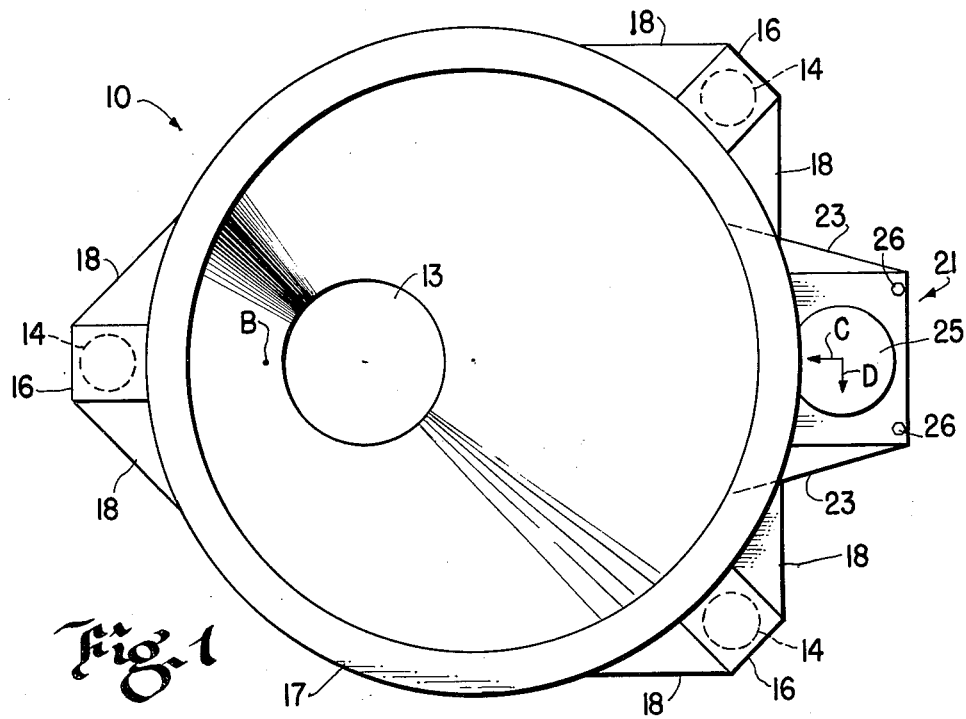
FIG. 1 is a plan view of one form of vibrated hopper according to this invention.
Figure 2:
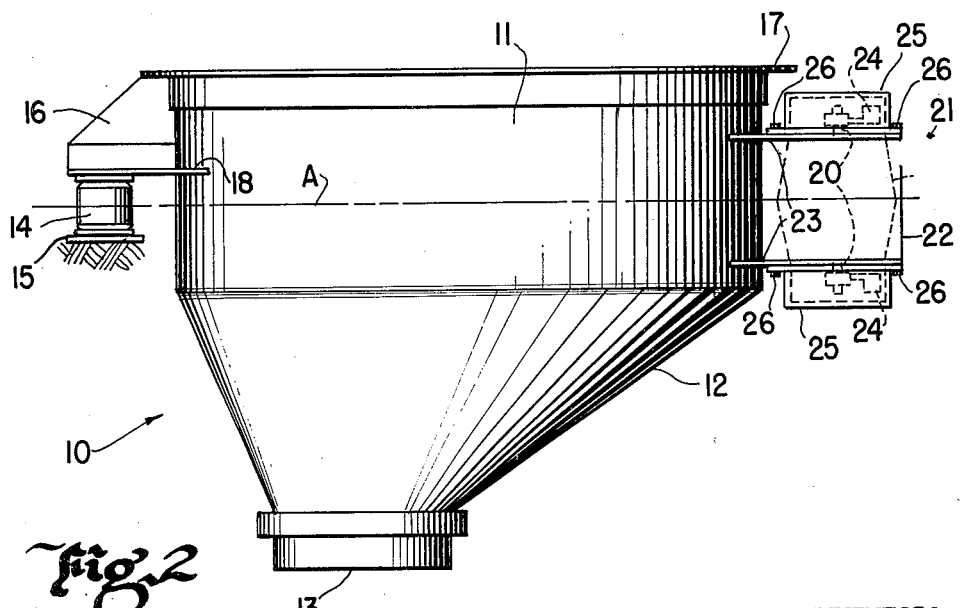
FIG. 2 is an elevational view of the hopper shown in FIG. 1.

Referring to FIGS. 1 and 2, the gyrated or vibrated hoppers that do work by vibration, contemplated by this invention, are of general utility as supply hoppers from which material is intended to flow. The hoppers are hung from larger stationary hoppers or constitute the entire hoppers for relatively small volume storage. A hopper 10, which can be of any shape, size or weight, is shown having a cylindrical upper portion 11 and a bottom portion 12 which tapers downwardly to an off-center, round discharge opening 13.

The hopper 10 is supported through three isolation mounts 14 which support the hopper for movement in any direction, the mounts 14 being 120 degrees apart as shown in FIG. 1. For simplicity of illustration, FIG. 2 shows only one of the mounts 14. Any suitable isolating suspension, such as rubber bags filled with air or liquid, solid rubber members or coil springs can be used. Each of the isolation mounts 14 is supported upon a base plate 15 and is connected to the hopper 10 through a bracket 16 which is fixed to an annular flange 17 on the hopper 10 adjacent its intake end and to the vertical side of the cylindrical upper portion 11 of the hopper 10, the brackets 16 being provided with wings 18 to securely tie them to the hopper wall. This supports the hopper 10 adjacent its upper or intake end by resilient mounting means, i.e., the isolation mounts 14, the hopper being free to vibrate with the mounts isolating the vibrations of the hopper from supporting structure.

The entire suspended hopper 10 is vibrated from top to bottom along a horizontal path to effect or ensure the flow of material therefrom. An exciter motor 19, having a double extended shaft 20, is mounted to locate the shaft 20 vertically (parallel to the hopper axis) by means of a box 21 having vertical sides 22, the box 21 being carried by two horizontal plates 23 secured to the vertical side of the cylindrical upper portion 11 of the hopper 10. The driving force for the system is supplied by two rotating eccentric flywheels or weights 24, which generate horizontal centrifugal forces, secured to the drive shaft 20. Access to the weights 24 is provided through covers 25 attached to the plates 23 by means of nuts and bolts 26. The weights 24 are located at equal distances on opposite sides of a horiozntal plane A, with the resultant center of gravity of the rotating mass being located in such horizontal plane A. Each of the weights 24 is displaced from the shaft axis in the same direction, and the rotating mass tends to spin upon a vertical axis in space which is a vertical axis passing through the center of gravity of the rotating mass. When the rotating mass including the shaft and the weights spins upon a vertical axis passing through the center of gravity of the rotating mass, the shaft 20 is orbiting around that axis, thus transmitting an orbiting or circular movement to the motor 19 and to the portion of the hopper 10 to which the motor is connected. The motor 19, shaft 20 and weights 24 thus function as an exciter to vibrate the hopper. The exciter, hopper and isolation mounts form a vibratory system.

The center of gravity of the hopper 10 also is located in horizontal plane A as are also the midpoints of the isolation mounts 14 as viewed in FIG. 2. The center of gravity of the hopper is about the same whether it is full or empty. Accordingly, the center of gravity of everything that is vibrated for all practical purposes is located in horizontal plane A.

The essence of the invention resides in vibrating the hopper 10, which is mounted to move in any direction, by means of the rotatable weights 24 having a resultant center of gravity which is located in horiozntal plane A that also contains the center of gravity of the hopper 10. This arrangements results in a combination movement for the hopper 10 which rocks about its center of percussion and also slides in line with its center of percussion in a horizontal movement having negligible vertical components, the center of percussion being defined as the pivot point (see point B, FIG. 1, for example) about which a body turns when a force is applied to the body off set from its center of gravity. A pencil held vertically point down on the annular flange 17 adjacent the motor box 21 generates a relatively round ellipse on the flange as the hopper vibrates and on the annular flange 17 remote from the motor box 21 generates a relatively flat ellipse as the hopper vibrates. A particle at point B would generate a straight line.

The above combination movement of the hopper 10 can be explained by resolving the forces involved into conponents C and D (FIG. 1). Force component C moves the hopper 10 rectilinearly, i.e., force component C slides the hopper 10 back and forth through center of percussion B. Force component D rocks the hopper 10, i.e., force component D oscillates the hopper 10 about center of percussion B. The rocking movement is a sine wave movement which stops at one end of such movement and starts back toward the other end of such movement gaining speed after it starts back until it reaches a maximum speed at a point midway between such ends and then decelerates until it reaches such other end whereupon it stops and starts back the other way. The sliding movement is ninety degrees out of phase with the rocking movement, i.e., when the sliding movement stops and starts back the other way, the rocking movement has attained its maximum speed, and vice versa. This combination movement is a horizontal movement having negligible vertical components. As viewed from the side (FIG. 2), the hopper 10 is moved with this combination horizontal movement equally from top to bottom producing uniform agitation from top to bottom with high amplitude vibrations. The hopper 10 tends to move horizontally only because the exciter is centered in the horizontal plane A of the center of gravity of the hopper, there being no mechanical restraints against vertical hopper movements.

One of the features of the hopper 10 resides in its superior simplicity, the hopper being supported through the three isolation mounts 14 with no means being provided or needed to restrain the hopper against vertical hopper movements. No such restraints are needed because the horizontal hopper movement has negligible vertical components.

Another feature resides in using only the horizontal gyratory movement which consumes a minimum of power and does no vibrate the hopper supports 15.

Another feature resides in moving the hopper 10 equally from top to bottom as viewed in FIG. 2. This produces uniform agitation from top to bottom with high amplitude vibrations (in the order of a one-quarter inch vibratory stroke) to move difficult-to-handle materials without packing them and prevents or breaks bridging at all levels in the hopper.

Only the one motor 19 is used to drive the entire gyrated hopper. Since the vibrating motion is parallel to the ground, it will not dampen out with variations in head load or storage bin content. The gyratory vibration provides fluidization and induces flow at an accurate and even flow rate. Very large units, however, may require more than one motor. The motors are arranged symmetrically for the most benefit (two motors are arranged 180 degrees apart, etc.), the criterion being that each exciter must be centered in the horizontal plane A of the center of the gravity of the hopper. Although a plurality of motors arranged as above described produce a horizontal movement having negligible vertical components, the form of the movement depends on whether the rotating eccentric flywheels or weights rotate in the same or opposite directions and how the weights lock in. Taking a system provided with two exciters, for example, if the weights are turned in the same direction the weights will become synchronized or will lock in in the way which requires the least energy. The synchronized arrangement will be either one where the sets of weights approach each other as they rotate in their obits and come relatively close together once during every revolution (hopper oscillates about its axis) or one where the sets of weights never approach each other (hopper orbits as though driven by one motor, except that the movement is circular at all points). If the sets of weights are turned in opposite directions, a rectilinear hopper translation occurs.

A modification is shown in FIG. 3. Reference numerals in FIGS. 1 and 2 which are similar to those in FIG. 3 refer to parts generally alike in structure and function. A hopper 10a is shown having an inverted truncated cone portion 27 which tapers downwardly to a centered round discharge opening 13a. The hopper 10a is equipped with a manually adjustable gate 28 at the discharge end. The gate 28 provides a variable discharge of the material or a positive shut-off if required. A seal (not shown) is used between a storage bin and the top of the gyrated hopper 10a.

The hopper 10a is supported through four isolation mounts which are not shown but which are like the isolation mounts 14 (FIGS. 1 and 2), the four isolation mounts being 90 degrees apart. Each of the isolation mounts is connected to the hopper 10a through a channel shaped bracket 16a which is fixed to an annular flange 17a on the hopper 10a adjacent its intake end and to the side of the cone shaped portion 27 of the hopper 10a, the brackets 16a being securely tied to the cone shaped portion 27 of the hopper 10a by means of horizontal plates 29 fixed to such hopper portion 27. The entire suspended hopper 10a is vibrated to effect or ensure the flow of material therefrom by an exciter motor contained within a box 21a. Like the hopper 10, the hopper 10a tends to move horizontally only because the exciter within the box 21a is centered in the horizontal plane containing the center of gravity of the hopper 10a.

The hopper 10a has been used successfully to accurately discharge wood flour (140 mesh, 10–15 PCF) from a storage bin, i.e., such hopper 10a is a live bottom for a stationary storage bin. The gyratory vibration provides fluidization and induces flow to the wood flour contained within. Degradation and attrition are at a minimum and the wood flour discharges at an accurate and even flow rate. As an example only, this particular hopper has the following specifications:

Size hopper (volume)—115 cu. ft.
Overall height—5'–7"
Dia. at top—7'–5"
Slope of sides—60°
Weight—1800#
Vibratory stroke—¼"
Feed rate—0–1000 cu. ft. per hr. (intermittent service)
Motor (drive)—Vibratory type ¾ H.P., 3 phase, 220/440 v., 60 cycle
Frequency—900 r.p.m.
Isolators—Firestone air mounts (liquid filled)

It is to be understood that the above description is illustrative of this invention and that various modifications thereof can be utilized without departing from its spirit and scope.

Having described the invention, we claim:

1. A vibratory hopper system comprising, in combination, a hopper structure which is supported by an isolating suspension and has a bottom discharge opening, and an exciter which forms with the hopper structure and the isolating suspension a vibratory system, and which is connected to the hopper structure and directed to apply to the hopper structure vibratory forces the resultant of which acts in the horizontal plane containing the center of gravity of the hopper structure, so as to vibrate the hopper structure equally from top to bottom with a horizontal movement having negligible vertical components.

2. A vibratory hopper system according to claim 1 wherein the isolating suspension comprises a plurality of resilient mounts.

3. A vibratory hopper system according to claim 2 wherein the resilient mounts are intersected by the horizontal plane containing the center of gravity of the hopper structure so that the resultant of the vibratory forces applied by the exciter to the hopper structure produces no appreciable vertical movement about the mounts.

4. A vibratory hopper system according to claim 1 wherein the exciter comprises a plurality of members for generating forces the resultant of which is a vibratory force acting in the horizontal plane containing the center of gravity of the hopper structure.

5. A vibratory hopper system according to claim 1 wherein the exciter comprises a plurality of eccentrics each rotatable on a vertical axis, the eccentrics being distributed above and below the horizontal plane containing the center of gravity of the hopper structure and being synchronized so that the resultant of the centrifugal forces generated by the eccentrics is a vibratory force acting in such plane.

References Cited by the Examiner
UNITED STATES PATENTS

| | | | |
|---|---|---|---|
| 2,246,497 | 6/1941 | Beck | 222—161 |
| 3,078,015 | 2/1963 | Wahl | 222—161 |

WILLIAM I. PRICE, *Primary Examiner.*

WALTER A. SCHEEL, *Examiner.*

JOHN M. BELL, *Assistant Examiner.*